United States Patent
Kerek

(10) Patent No.: US 9,906,302 B2
(45) Date of Patent: Feb. 27, 2018

(54) DISTRIBUTION NETWORK FOR A DISTRIBUTED ANTENNA SYSTEM

(71) Applicant: Deltanode Solutions AB, Stockholm (SE)

(72) Inventor: Daniel Kerek, Danderyd (SE)

(73) Assignee: DELTANODE SOLUTIONS AKTIEBOLAG, Stockholm (SE)

( * ) Notice: Subject to any disclaimer, the term of this patent is extended or adjusted under 35 U.S.C. 154(b) by 0 days.

(21) Appl. No.: 14/431,290

(22) PCT Filed: Sep. 23, 2013

(86) PCT No.: PCT/EP2013/069685
§ 371 (c)(1),
(2) Date: Mar. 25, 2015

(87) PCT Pub. No.: WO2014/048866
PCT Pub. Date: Apr. 3, 2014

(65) Prior Publication Data
US 2015/0223242 A1    Aug. 6, 2015

Related U.S. Application Data

(60) Provisional application No. 61/705,913, filed on Sep. 26, 2012.

(30) Foreign Application Priority Data

Sep. 26, 2012   (SE) ........................................ 1200578

(51) Int. Cl.
*H04B 10/2575*  (2013.01)
*H04W 88/08*   (2009.01)
(Continued)

(52) U.S. Cl.
CPC ....... *H04B 10/2575* (2013.01); *H04B 1/0057* (2013.01); *H04B 1/69* (2013.01);
(Continued)

(58) Field of Classification Search
CPC .......... H04B 10/2575; H04B 10/25753; H04B 1/0057; H04B 1/69; H04B 10/2504; H04W 88/085; H04W 72/0453; H04W 88/10
See application file for complete search history.

(56) References Cited

U.S. PATENT DOCUMENTS 4,916,460 A    4/1990 Powell
5,202,780 A    4/1993 Fussanger
(Continued)

FOREIGN PATENT DOCUMENTS

EP    0756185 A2    1/1997
TW    200703951     1/2007
(Continued)

OTHER PUBLICATIONS

Office Action in related SE Patent No. 1200578-1, dated May 20, 2015; pp. 1-9.
(Continued)

*Primary Examiner* — Ajay Cattungal
(74) *Attorney, Agent, or Firm* — Wegman, Hessler & Vanderburg

(57) ABSTRACT

A Distributed Antenna System (DAS) including a distribution network is disclosed. The DAS is arranged for providing signaling between a Remote Unit Controller (RUC) and at least one active Remote Unit (RU) of said DAS, wherein said RUC is connected to a core network and is arranged for providing RF signals to said DAS. A first part of a spectrum of said signaling is allocated for transmission of at least one RF link to and from said at least one active RU. The present
(Continued)

invention is characterized in that at least one second part of said spectrum, being separate from said first part, is allocated for transmission of at least one digital link for supplying digital communication signals for one or more of: at least one Remote Radio Head (RRH) unit, at least one Wireless Local Area Network (WLAN) unit, at least one pico base station, at least one femto base station, and at least one Ethernet unit.

18 Claims, 2 Drawing Sheets

(51) Int. Cl.
| | |
|---|---|
| *H04B 1/00* | (2006.01) |
| *H04B 1/69* | (2011.01) |
| *H04W 72/04* | (2009.01) |
| *H04B 10/25* | (2013.01) |
| *H04W 88/10* | (2009.01) |

(52) U.S. Cl.
CPC ... *H04B 10/2504* (2013.01); *H04B 10/25753* (2013.01); *H04W 72/0453* (2013.01); *H04W 88/085* (2013.01); *H04W 88/10* (2013.01)

(56) References Cited

U.S. PATENT DOCUMENTS

| | | | |
|---|---|---|---|
| 5,748,348 | A | 5/1998 | Heidemann |
| 7,333,726 | B2 | 2/2008 | Kenny et al. |
| 7,362,931 | B2 | 4/2008 | Gall |
| 7,565,170 | B2 | 7/2009 | Buscaglia |
| 7,599,386 | B2 | 10/2009 | Laamanen |
| 7,929,862 | B2 | 4/2011 | Hakomori et al. |
| 9,143,234 | B2 | 9/2015 | Campos |
| 9,300,399 | B2 | 3/2016 | Campos |
| 9,526,020 | B2 | 12/2016 | Berlin |
| 2002/0075539 | A1 | 6/2002 | Iida et al. |
| 2002/0080448 | A1 | 6/2002 | Kim |
| 2005/0151215 | A1* | 7/2005 | Hauhe ............... H01Q 21/0025 257/421 |
| 2006/0172775 | A1* | 8/2006 | Conyers ............... H04W 84/14 455/561 |
| 2010/0278530 | A1* | 11/2010 | Kummetz ........... H04W 88/085 398/41 |
| 2010/0296816 | A1* | 11/2010 | Larsen ............. H04B 10/25754 398/116 |
| 2011/0176809 | A1 | 7/2011 | Hakomori |
| 2011/0268446 | A1* | 11/2011 | Cune ............... H04B 10/25753 398/79 |
| 2011/0268452 | A1 | 11/2011 | Beamon et al. |
| 2012/0057572 | A1 | 3/2012 | Evans et al. |
| 2012/0269509 | A1* | 10/2012 | Hultermans ..... H04B 10/25756 398/43 |
| 2013/0004173 | A1 | 1/2013 | Maricevic |
| 2013/0114963 | A1* | 5/2013 | Stapleton ............. H04W 24/02 398/115 |
| 2013/0265117 | A1* | 10/2013 | Ng ......................... H04B 1/40 333/26 |

FOREIGN PATENT DOCUMENTS

| | | |
|---|---|---|
| TW | 201210230 | 3/2012 |
| WO | 2009143176 A2 | 11/2009 |
| WO | 2012115843 A1 | 8/2012 |
| WO | 2014048919 | 4/2014 |

OTHER PUBLICATIONS

International Search Report and Written Opinion dated Dec. 10, 2013 for corresponding application No. PCT/EP2013/069685.
S.H. Lee et al, Reduction of inter-channel crosstalk using Mach-Zehnder type filter in digital/RF optical transmission link, IEE Proceedings online No. 20045066, IEE Proc.-Optoelectron., vol. 152, No. 4, Aug. 2005 pp. 189-192.
Office Action in related SE1200578-1, dated Apr. 23, 2013, pp. 1-6.
Response dated Oct. 22, 2013, pp. 1-15, to Office Action in related SE1200578-1 dated Apr. 23, 2013.
Office Action in related SE1200578-1, dated Oct. 1, 2014, pp. 1-6.
Response dated Jan. 29, 2015, pp. 1-31, to Office Action in related SE1200578-1 dated Oct. 1, 2014.
Office Action in related EP App. No. 13 766 057.7-1857, dated Dec. 21, 2016.
Office Action in related EP App. No. 13 770 438.3-1857, dated Dec. 23, 2016.
International Search Report and Written Opinion dated Dec. 10, 2013 for corresponding application No. PCT/EP2013/069847.
Office Action in related U.S. Appl. No. 14/431,301, dated Mar. 9, 2016.
Notice of Allowance dated Jan. 1, 2017 for U.S. Appl. No. 14/431,301.
Office Action in related U.S. Appl. No. 15/392,426, dated Feb. 6, 2017.
Notice of Allowance dated Nov. 22, 2017 for related U.S. App. No. 15/392,426; (pp. 1-13).
Summons to Attend Oral Proceedings for related EP 13770438.3, dated Nov. 7, 2017.
Summons to Attend Oral Proceedings for related EP 13766057.7, dated Nov. 7, 2017.
Office Action dated Nov. 11, 2017 in related TW App. No. 102134736.
Office Action dated Dec. 12, 2017 in related TW App. No. 102134731.

* cited by examiner

DISTRIBUTION NETWORK FOR A DISTRIBUTED ANTENNA SYSTEM

CROSS-REFERENCE TO RELATED APPLICATIONS

This application is the US National phase entry of International Patent Application No. PCT/EP2013/069685 filed Sep. 23, 2013, which claims priority to both US Patent Application No. 61/705,913 entitled "Distribution Network for a Distributed Antenna System" filed on Sep. 26, 2012 and Swedish Patent Application No. 1200578-1 entitled "Distribution Network for a Distributed Antenna System" filed on Sep. 26, 2012, all of the above listed applications are incorporated by reference herein.

FIELD OF THE INVENTION

The present invention relates to a Distributed Antenna System (DAS) as defined in the preamble of claim 1.

The present invention also relates to a method for providing signaling in a DAS as defined in the preamble of claim 12.

The present invention also relates to computer program and to a computer program product.

RELATED ART AND BACKGROUND OF THE INVENTION

There is a very large, and still rapidly growing, demand for wireless communication services today. Mobile telephone services are used to a very large extent, e.g. for telephone conversations and text messages. Also, high speed wireless communication is used for a large number of applications, such as internet browsing, streaming of music, films and/or television, and the like.

Since the demand for wireless communication services is very high, and the end users expect the wireless services to be available essentially everywhere they go, the wireless communication system coverage must cover very large geographical areas, both indoors and outdoors, and also provide high bitrates in these areas.

Traditionally, radio base stations, such as Base Transceiver Stations (BTS) and/or NodeBs and/or eNodeBs, hereinafter called Remote Unit Controllers (RUC), are typically located very close to a tower comprising one or more tower-mounted antennas. Said RUCs are provided with all the circuitry necessary for sending and receiving the wireless communication signals to and from the mobile equipments connecting to it, such as Mobile Stations (MS) or User Equipments (UEs). The radio base stations have typically been arranged in cells. The traditional radio base stations include both the circuitry to receive and transmit signals from and to a core network and to receive and transmit signals from and to the one or more antennas, including radio frequency (RF) circuits and power amplifiers, as is illustrated in FIG. 1.

In FIG. 1, the traditional radio base station 101 in a traditional communication system is located close to a tower 102 being connected to a base station 101 by a cable 103, where the cable 103 often is a coaxial cable. The tower 102 has one or more antenna arrangements and the radio base station 101 and the one or more antenna arrangements provide coverage for a cell in the system. The radio base station 101 is connected to the core network 104. In the radio base station 101, circuitry for handling the signaling of the transport layer, the control layer, the synchronization layer, the baseband layer and the radio layer are arranged. Also, power amplifiers are arranged within the radio base station 101. Thus, the radio base station 101 provides RF signals to the antenna in the tower 102. Possibly, a Tower Mounted Amplifier (TMA) is required in the tower 102 due to losses in the cable 103 from the base station circuitry in the radio base station 101 to the one or more antenna arrangements in the tower 102. The cells, each being covered by such a radio base station 101, have traditionally been planned and located side by side with other cells such that an acceptable coverage of a geographical area is achieved. However, since the end users nowadays expect the high speed wireless communication services, such as mobile telecommunication services, wireless fidelity networks (WiFi), and Wireless Local Area Networks (WLANs), to be available essentially everywhere, it would be very costly to build traditional radio base stations at every site where coverage and high bitrates are needed. Also, in indoor locations, such as in malls, railway tunnels, road tunnels, restaurants, cafés, airports, conference centers, tunnels, stadiums and exhibition halls, the traditional radio base station concept results in poor service coverage and bitrates.

To solve this problem, Distributed Antenna Systems (DAS) have been developed. One example of such DAS is schematically disclosed in FIG. 2. Here, one or more Remote Unit Controllers (RUC; 212), each possibly being utilized by one operator/service provider and providing one system and/or service, are being connected to a RUC interface 231. The RUC interface 231 is arranged for providing an interface for one or more RUC 212 and/or one or more fiber cables 230. As mentioned above, typically, the one or more RUCs 212 are radio base stations, such as a BTS or an eNodeB or the like of the type being described above in connection with FIG. 1. These radio base stations provide RF signals to the RUC interface 231. The RUC interface 231 then combines the RF signals from each of the RUs and provides these combined RF signals to one or more fiber cables 230. Thus, the combined RF signals being provided to the fiber cable 230 may include a one or more of RF signals related to a number one or more services and/or service providers. The fiber cable 230 can then distribute the RF signals to one or more Remote Units (RU; 222) and antenna arrangements 228, being located at suitable locations for proving coverage and sufficient bitrates where the demand is.

The DAS concept has a number of advantages. One such advantage is that DAS can be utilized for physically separating the spatially large and power consuming base station circuitry from the one or more antenna arrangements. For example, in environments where the space is limited and/or where power supply is limited or costly to provide, it can be very advantageous to place the RUCs 212 at a location, possibly a central location, where space and power are available, and then distribute the RUs 222 to locations where coverage and high bitrates are needed, but where there is a shortage in space and/or power supply. This also reduces the installation costs, since the more bulky and space consuming RUC can be placed where there is plenty of room, which usually results in a lower rent for the premises.

There are also esthetical advantages in implementation of DAS, since the smaller RUs can easily be designed e.g. to fit into the interior of a mall, an airport or the like. The operation and maintenance costs can also be significantly reduced when DAS is utilized, since maintenance is easier, and therefore also less costly, in one convenient RUC location having more space, and possibly being located centrally, than in a large number of possibly less convenient distributed RU locations.

If the fiber cables 230 are chosen and set up properly, the RUs 222 can be spaced long distances apart from the RUC, functional distances of tens of kilometers can be reached, such that very large geographical areas can be covered by the DAS.

Also, smaller cells have been developed, such as pico cells and femto cells, which can be used for increasing coverage and bitrates, and to lower the costs. The micro base stations and pico base stations are complete standalone radio base stations, including all the circuitry of the traditional radio base stations, including all the circuitry necessary for sending and receiving the wireless communication signals to and from the mobile equipment, however they can be deployed such that coverage and bitrates can be optimized for the geographical area of the communication system, both outdoors and indoors.

A further development of the smaller cell concept is the Remote Radio Head (RRH) concept. The RRH concept breaks up the traditional radio base station architecture into a possibly centrally located processing facility, which in this document will be called RRH controller, and one or more distributed antennas units, in this document called RRH units, being connected to the processing facility through a network preferably having a high bandwidth.

Here, all the traditional radio base station processing equipment except for the radio frequency processing equipment and the power amplification equipment are located in the RRH controller, whereas the radio frequency processing equipment and power amplification equipment are located in the distributed RRH units. An example of the RRH concept is schematically illustrated in FIG. 3.

In FIG. 3, the RRH controller 301 is arranged as a distribution node. The RRH controller 301 can be located centrally in the network and can also be implemented as a base station hotel. In the RRH controller 301, circuitry for handling the signaling of the transport layer, the control layer, the synchronization layer, and the baseband layer is arranged.

The RRH controller 301 is connected to the distributed RRH units 302 by a preferably high bandwidth distribution network 303. The distribution network 303 provides a digital link between the RRH controller 301 and the RRH units 302. The RRH controller 301 is further connected to the core network 304. In the distributed RRH units 302, the radio layer circuitry and power amplifiers are arranged. In FIG. 3, the number of distributed RRH units 302 has been limited to two RRH units 202 to enhance the intelligibility of the figure. However, a large number of distributed RRH units can be connected to the RUCs.

As has been described above, there are today a number of concepts available for extending the coverage of mobile services and for enhancing the bitrates at certain locations in the systems. However, each system working according to these concepts have to be installed, maintained, monitored and controlled. Also, each one of these systems have to be provided with power supplies, distribution networks, locations for mounting radio base stations, RUCs, RRH controllers, towers, RUs, RRH units and antenna arrangements. Thus, to provide sufficient coverage and bitrates today is very costly, and it is also very work and time consuming to monitor and maintain all of these different systems.

AIM AND MOST IMPORTANT FEATURES OF THE INVENTION

It is an object of the present invention to provide a more efficient and cost effective distribution network that solves the above stated problem.

The object is achieved by the above mentioned DAS according to the characterizing portion of claim 1.

The object is also achieved by the above mentioned method for signaling in the DAS according to the characterizing portion of claim 11.

The object is also achieved by the above mentioned computer program and computer program product.

The distribution network and method for signaling over such a DAS according to the present invention are characterized in that the spectrum of the signaling is divided into at least two parts, wherein the first part of the spectrum is allocated for transmission of at least on RF link for DAS, such as RF over fiber for an embodiment of the present invention utilizing a fiber based communication network in the DAS. The at least one second part of the spectrum is allocated for transmission of at least on digital link. This at least one digital link can be utilized for supplying digital communication signals for at least one RRH unit and/or at least one Wireless Local Area Network (WLAN) unit and/or at least one pico base station and/or at least one femto base station and/or at least one remote Ethernet unit.

A combined signaling of both analog RF transmission for the DAS and digital transmission for one or more of at least one RRH unit, at least one WLAN unit, at least one pico base station, at least one femto base station and at least one remote Ethernet unit thus achieved by the present invention, which results in that a very efficient and cost effective utilization of the distribution network is achieved. Also, an overall low cost DAS, which can supply a number of services in parallel, is provided. Also, by different embodiments of the present invention, at least one or more in the group of: a RRH unit, a WLAN unit; a pico base station; a femto base station; a remote Ethernet unit; or a combination thereof, is/are integrated in a RU of the DAS. This has a number of integration advantages regarding e.g. network costs, mounting costs and power supplies. The total weight of, and wind forces caused by, these units can also be reduced by the integrated implementation of the units in the DAS RUs.

According to an embodiment of the present invention, the first part of the signaling spectrum conveys analog RF signals for the one or more RUs of the DAS and the second part of the spectrum conveys digital RRH communication signals for the RRH units.

According to an embodiment of the present invention, the first part of the signaling spectrum conveys RF DAS signals for the one or more DAS RUs and the second part of the spectrum WiFi/WLAN communication signals. The analog DAS RF signals and the digital WiFi/WLAN communication signals are diplexed and transmitted over the distribution network.

Detailed exemplary embodiments and advantages of the distribution network and method for signaling according to the invention will now be described with reference to the appended drawings illustrating some preferred embodiments.

DETAILED DESCRIPTION OF PREFERRED EMBODIMENTS

Figure 1:
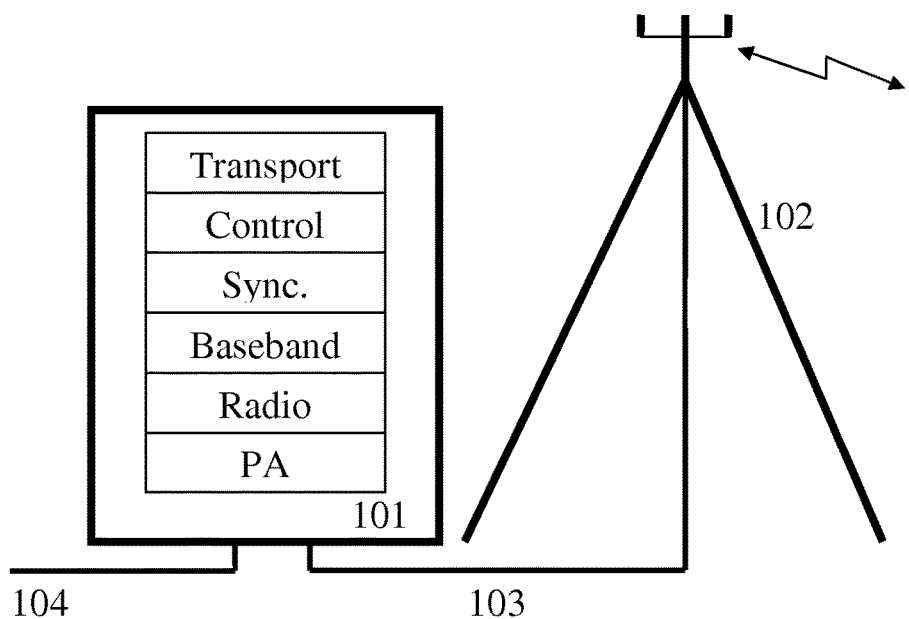
FIG. 1 shows a traditional base station configuration.
Figure 2:
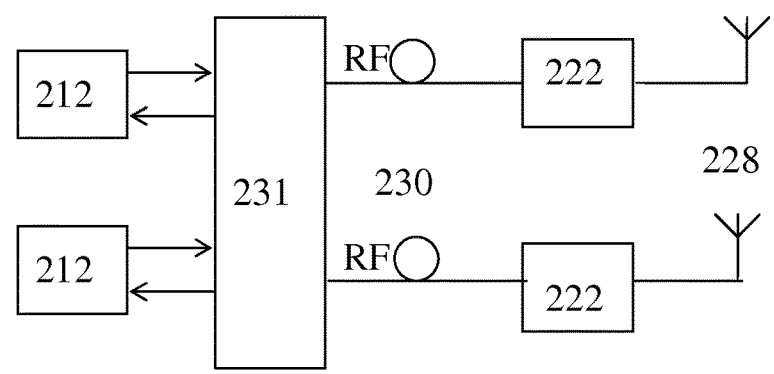
FIG. 2 shows a traditional DAS.
Figure 3:
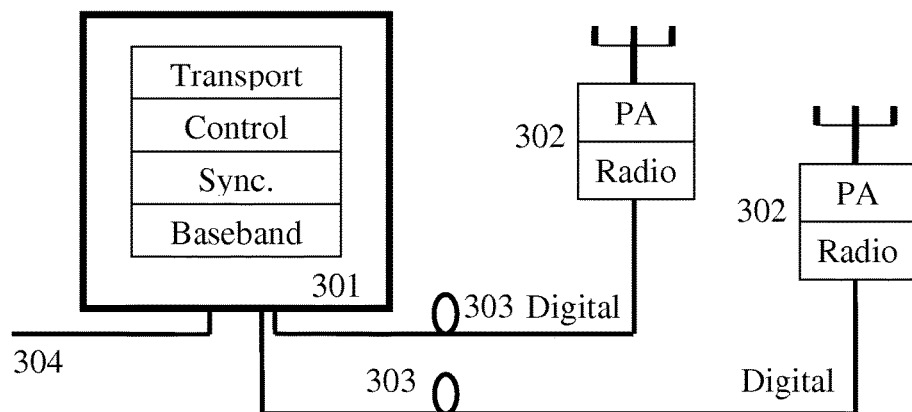
FIG. 3 shows a RRH concept.
Figure 4:
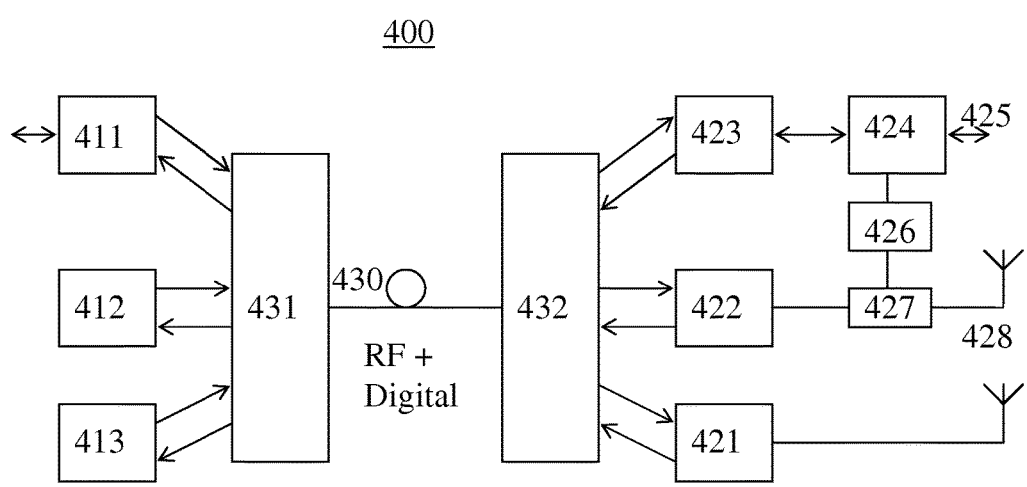
FIG. 4 shows a DAS according to the invention.

FIG. 4 schematically shows a Distributed Antenna System (DAS) 400, which utilizes the present invention. In the DAS 400, one or more RUC 412, each possibly being utilized by one operator/service provider and providing one system and/or service, are connected to a distribution network including a multiplexing unit 431 and a corresponding remote multiplexing unit 432 being connected to each other by bidirectional connection 430. The remote multiplexing unit 432 is arranged for demultiplexing signals having been transmitted over the bidirectional connection 430 from RUCs 412 via the multiplexing unit 431, and for multiplexing signals from one or more RUs 422, being connected to the remote multiplexing unit 432, that are to be transmitted to the multiplexing unit 431. Thus, in the DAS 400 according to the invention, the one or more RUCs 412, the distribution network 430, 431, 432 and the one or more active RUs 422 correspond to a traditional DAS system, as described above, which provides information between the one or more RUCs 412 and the one or more RUs 422 via RF signals over the distribution network 430, 431, 432.

Thus, the DAS 400 provides signaling between the at least one RUC 412 and the at least one active RU 422. The active at least one active RU 422 includes the RF circuitry needed for transmitting and receiving RF signals, such as one or more filters, one or more mixers, one or more amplifiers and/or power amplifiers. The at least one active RU 422 is connected to one or more antenna arrangements 428. Thus, in the RUCs 412 includes the baseband circuitry, while the RUs 422 include the RF circuitry.

The spectrum of the signaling is according to the present invention divided into at least two parts. The first part of the spectrum is allocated for transmission of at least on RF link, i.e. for transmission of RF signals, between the at least one RUC 412 and the at least one active RU 422. Thus, the first part of the signaling spectrum is utilized for RF transmission in accordance with a traditional DAS. For example, the first part of the spectrum conveys RF over fiber for an embodiment of the present invention utilizing a fiber based communication network as the bidirectional link 430.

According to the present invention, the at least one second part of the spectrum is allocated for transmission of at least on digital link, where this second part is separated from the first part, e.g. by a multiplexing method, as will be described more in detail below. This at least one digital link can be utilized for supplying digital communication signals for at least one RRH unit 421 and/or at least one Wireless Local Area Network (WLAN) unit 426 and/or at least one pico base station and/or at least one femto base station and/or at least one remote Ethernet unit 423.

The RRH units 421 communicate with the RRH controllers 413 over the at least one digital link, wherein the RRH controller 413 includes a Base Band Unit (BBU) being arranged for performing all of the base band processing needed for communication with the mobile equipment utilizing the mobile services being provided by the RRH unit 421. The RRH units include the circuitry for performing all the above described RF processing, and amplification of transmitted signals and reception of received signals, but do not include e.g. the base band circuitry, which is located in the RRH controller 413, as has been described above. Signals are here transmitted and received over the air interface by the at least one antenna arrangement 428. The RRH units 421 can be signaled to over a standardized protocol, such as a Common Public Radio Interface (CPRI) protocol, or an Open Base Station Architecture Initiative (OBSAI) protocol. The standardized protocol is used for conveying digital communication between the RRH controllers 413 and the RRH units 421 over the digital link.

The at least one remote Ethernet unit 423 communicates with at least one Ethernet unit 411 over the at least one digital link. The at least one Ethernet unit 411 provides a connection to the core network, e.g. via an Ethernet and/or optical fiber connection. Thus, according to the present invention, both at least one analog RF link for traditional DAS communication and at least one digital link for communication with one or more of at least one RRH unit 421, at least one WLAN unit 426, at least one pico base station, at least one femto base station, and at least one remote Ethernet unit 423 are provided by the distribution network 430, 431, 432. The distribution network 430, 431, 432 can here include technologies and/or one or more cables or fibers, which will be explained more in detail below.

The present invention thus provides a DAS, in which a traditional DAS can be implemented in parallel with one or more of RRH, WLAN, pico/femto base stations and Ethernet is achieved. In other words, the analog RF link of the traditional DAS can, according to the present invention, share the spectrum of the signaling over the distribution network 430, 431, 432 with the digital link that can be used for providing the services being implemented in parallel with the traditional DAS.

This has a number of advantages. Since the spectrum of the distribution network here can be shared by the analog RF link and the digital link, the total costs for distribution networks is lowered. Previously, the DAS, the RRH, the WLAN, and the Ethernet basically each had to use one separate distribution network, which was, of course expensive. Also, since one single distribution network can be utilized for providing both the analog RF links and the digital links, only one power supply for this single distribution network is needed.

Further, the DAS has a well working monitoring and maintenance system, which, according to the present invention can be utilized for monitoring and maintenance of essentially all of the DAS units, and of the units for the RRH service, the WLAN service, the pico/femto cells, and the Ethernet service.

By utilization of the present invention, a combined signaling over of the distribution network 430, 431 of both analog RF link transmission for the RUs 422 and the digital link transmission for, e.g. for the RRH units 422 according to a standardized protocol can be performed. Hereby a very efficient utilization of the distribution network 430, 431, 432 is achieved, which also is cost effective since an open standardized protocol is used for the digital RRH transmission and since transmission for multiple services can be jointly performed on the distribution network 430, 431, 432.

According to an embodiment of the present invention, the signaling spectrum for the signaling being performed over the distribution network is divided into a first part, and two second parts. These first and two second parts of the spectrum are arranged separately from each other, i.e. they are disjunctive. Here, the first and second parts are used for conveying RF signaling for the one or more RUs 422, digital communication according to the standardized protocol for the one or more RRHs 421, and digital Ethernet communication signals, respectively. The Ethernet communication signals are provided to and from at least one remote Ethernet unit 423. The remote Ethernet unit 423 is connected to a switch 424 for providing the digital Ethernet communication signals to and from the mobile equipment of the end users via e.g. a coaxial cable, a fiber or the like 425. A skilled person realizes that essentially any suitable network technology and/or protocol resembling Ethernet can be implemented according to the embodiment of the present invention. Thus, the remote Ethernet unit 423, could be exchanged by essentially any other remote unit utilizing such a suitable network technology and/or protocol.

By utilization of this embodiment of the invention, the distribution network 430, 431, 432 can via the remote Ethernet unit 423 convey e.g. a high speed connection, such as an internet connection, to the end users in the DAS 400, in parallel with the other services being provided by the DAS 400.

According to an embodiment of the present invention, the first part of the signaling spectrum for the signaling being performed over the distribution network 430, 431, 432 conveys analog RF signals for the one or more RUs 422 of the DAS and the second part of the spectrum conveys digital RRH communication signals for the RRH units 421. Thus, the analog RF signals for the RUs 422 and the digital RRH communication signals are here and transmitted over the distribution network 430, 431, 432.

According to an embodiment of the present invention, the first part of the signaling spectrum for the signaling being performed over the distribution network 430, 431, 432 conveys RF DAS signals for the one or more RUs 422 and the second part of the spectrum conveys wireless fidelity (WiFi) communication signals. Thus, the analog RF signals for the RUs 422 and the digital WiFi/WLAN communication signals are diplexed and transmitted over the distribution network 430, 431, 432. Thus, the RF DAS signals and the WiFi signals being intended for the mobile equipment are merged by diplexing in the multiplexing unit 431 for providing a diplexed spectrum, and are then possibly further multiplexed with the other parts of the spectrum in the multiplexing unit 431. Thereafter, the multiplexed signal, including at least the first and second parts of the spectrum is conveyed over the distribution network 430, 431, 432. In the remote multiplexing unit 432, the multiplexed signal, including at least the first and second parts of the spectrum, is demultiplexed in the remote multiplexing unit 432, whereby the diplexed first and second parts of the spectrum, and possibly also other parts of the spectrum, are retrieved. Thereafter a signal corresponding to the diplexed first and second parts of the spectrum are provided to the at least one RU 422.

In the at least one RU 422, the necessary RF signal processing, e.g. amplification, is performed on the signal corresponding to the diplexed first and second spectrum parts, and the signal is provided to a remote diplexing unit 427. In the remote diplexing unit 427, the RF signals being intended for the at least one antenna arrangement 428 and the WiFi signals are separated, such that the RF signals are provided to the at least one antenna arrangement 428 and the WiFi signals are provided to the remote WiFi unit 426.

According to an embodiment of the present invention, the one or more RRH units 421 are integrated in the one or more RUs 422 of the DAS itself. Thus, the RRH units 421 are physically located in the same casing as the RUs 422. Hereby, the RRHs do not have to be mounted as separate units, which can reduce the installation work and thereby the installation costs. Also, since no mounting of RRH units as separate units e.g. on houses, poles, masts and the like, is needed, reduced costs for rental of space for such mounting are reduced.

According to an embodiment of the present invention, the one or more WiFi units 426 are integrated in the one or more RUs 422 of the DAS itself. Thus, the WiFi units 426 are here physically located in the same casing as the RUs 422, which significantly can reduce the installation costs and the costs for rental of mounting space. Also, the WiFi units 426 are relatively low cost units, wherefore the additional cost for adding the WiFi units 426 to the DAS RUs 422 is relatively low. Hereby, WLANs can easily be achieved in the system at a very low cost.

According to different embodiments of the invention, one or more of the at least one RRH unit 421, at least one WLAN/WiFi unit 426, at least one pico base station, at least one femto base station, and at least one remote Ethernet unit 423 are integrated in the at least one DAS RUs 422. Essentially any combination of these on or more units can be integrated in the DAS RUs 422. Hereafter, a number of examples of such integrations are mention. However, a skilled person understands that also other combinations of these units are possible to integrate in the DAS RUs 422.

According to an embodiment, the at least at least one RU 422 includes at least one RRH unit 421 being integrated in the at least one RU 422. Here, the at least one digital link is arranged for supplying digital communication signals for the at least one RRH unit 421.

According to an embodiment, the at least at least one RU 422 includes at least one RRH unit 421 and at least one WLAN/WiFi unit 426 being integrated in the at least one RU 422. Here, the at least one digital link is arranged for supplying digital communication signals for the at least one RRH unit 421 and the at least one WLAN/WiFi unit 426.

According to an embodiment, the at least at least one RU 422 includes at least one WLAN/WiFi unit 426 being integrated in the at least one RU 422. Here, the at least one digital link is arranged for supplying digital communication signals for the at least one WLAN/WiFi unit 426.

According to an embodiment, the at least at least one RU 422 includes at least one at least one RRH unit 421 and at least one pico/femto base station being integrated in the at least one RU 422. Here, the at least one digital link is arranged for supplying digital communication signals for the at least one RRH unit 421 and at least one pico/femto base station.

According to an embodiment, the at least at least one RU 422 includes at least one at least one RRH unit 421 and at least one remote Ethernet unit 423 being integrated in the at least one RU 422. Here, the at least one digital link is arranged for supplying digital communication signals for the at least one RRH unit 421 and at least one remote Ethernet unit 423.

According to an embodiment, the at least at least one RU 422 includes at least one RRH unit 421, at least one WLAN/WiFi unit 426 and at least one pico/femto base station being integrated in the at least one RU 422. Here, the at least one digital link is arranged for supplying digital communication signals for the at least one RRH unit 421, the at least one WLAN/WiFi unit 426, and at least one pico/femto base station. To be able to integrate all, or a suitable selection, of these units and services in the at least one RU 422 has a number of advantages. Only one distribution network 430, 431, 432, and only one power supply has to be used for a large number of services, which is very cost effective. Only one housing including the integrated RU 422 has to be mounted at a wall, pole, mast, or the like, which lowers the mounting space rental costs. Also, all the integrated services can be monitored by usage of the DAS monitoring system.

According to an embodiment of the present invention the distribution network 430, 431, 432 is a fiber based communication network. Thus, the RF signals being provided over the fiber based distribution network 430, 431, 432 form RF over fiber signals for the DAS.

According to other embodiments of the present invention, the distribution network 430, 431, 432 is a free-space optics communication network, a microwave communication network, a millimeter-wave communication network, or a broadband over power line communication network. A skilled person realizes that essentially any network suitable for conveying bidirectional communication at a high enough bitrate could be used as distribution network 430, 431, 432. Also, essentially any protocol and/or transmission technology may be implemented for the distribution network 430, 431, 432.

According to an embodiment of the present invention, the standardized protocol used for transporting the digital communication to and from the at least one RRH 421 over the digital link is a Common Public Radio Interface (CPRI) protocol or an Open Base Station Architecture Initiative (OBSAI) protocol. Both of these protocols can efficiently digitize RF signals and provide open standards for a digital interface between the RRH controller 413 and the RRHs 321. Thus, a low cost and easy connection of RRHs 421 directly to the RRH controllers 413 is achieved by use of these protocols. Also, these protocols allow the service providers to initially deploy lower bitrates and then to upgrade their networks as the bandwidth requirements grow.

According to an embodiment of the present invention, the multiplexing unit 431 and the remote multiplexing unit 432 apply wavelength division multiplexing (WDM) on the spectrum, such that each separate part of the spectrum utilizes a number of wavelengths being separate from wavelengths being utilized by other separate parts of the spectrum. Thus, the first part of the spectrum employs a first set of wavelengths and the at least one second part of the spectrum employs at least one second set of wavelengths, wherein the first and at least one second sets of wavelengths are separate from each other.

According to an embodiment of the present invention, the multiplexing unit 431 and the remote multiplexing unit 432 apply frequency division multiplexing (FDM) on the spectrum; such each separate part of the spectrum uses a number of frequencies being separate from frequencies being used by other separate part of the spectrum. Thus, the first part of the spectrum employs a first set of frequencies and the at least one second part of the spectrum employs at least one second set of frequencies, wherein the first and at least one second sets of frequencies are separate from each other.

According to an aspect of the present, a method for providing signaling DAS, including a distribution network 430, 431, 432, between at least one RUC 412 and at least one active RU 422 of the DAS 400 is presented. According to the method, allocation of a first part of a spectrum for the signaling is performed for transmission of at least one RF link to and from the at least one active RU 422. Allocation of at least one second part of the spectrum is performed. The at least one second part is separate from said first part, and is used for transmission of at least one digital link for supplying digital communication signals for one or more of: at least one RRH unit 421, at least one WLAN unit 426, at least one pico base station, at least one femto base station, and at least one remote Ethernet unit 423.

Hereby, efficient and cost effective transmission of both analog RF signals for the DAS RUs 422 and digital signals for one or more of: at least one RRH unit 421, at least one WLAN unit 426, at least one pico base station, at least one femto base station, and at least one remote Ethernet unit 423 are provided by the DAS 400.

The method of the invention can implemented in by computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The distribution network and the method for the distribution network according to the invention may be modified by those skilled in the art, as compared to the exemplary embodiments described above.

As is obvious for a skilled person, a number of other implementations, modifications, variations and/or additions can be made to the above described exemplary embodiments. It is to be understood that the invention includes all such other implementations, modifications, variations and/or additions which fall within the scope of the claims.

The invention claimed is:

1. A Distributed Antenna System (DAS; 400) including a distribution network (430, 431, 432) arranged for providing signaling between a Remote Unit Controller (RUC; 412) and at least one active Remote Unit (RU; 422) of said DAS, said RUC (412) being connected to a core network and providing RF signals to said DAS, wherein a first part of a spectrum of said signaling is allocated for transmission of at least one RF link to and from said at least one active RU (422); wherein at least one second part of said spectrum, being separate from said first part, is allocated for transmission of at least one digital link for supplying digital communication signals for one or more of:
   at least one Remote Radio Head (RRH) unit (421),
   at least one Wireless Local Area Network (WLAN) unit (426),
   at least one pico base station,
   at least one femto base station, and
   at least one remote Ethernet unit (423);
   wherein at least one or more of said RRH unit, said WLAN unit (426), said pico base station, said femto base station, said remote Ethernet unit (423), and/or a combination thereof, is/are physically located in the same casing as said at least one active RU of the DAS;
   the distribution network includes a multiplexing unit (431) and a corresponding remote multiplexing unit (432) being connected to each other by a bidirectional link (430) for transmission of the at least one RF link and the at least one digital link in both directions between the multiplexing unit and the remote multiplexing unit.

2. The DAS as claimed in claim 1, wherein said at least one digital link is arranged for supplying Ethernet communication signals.

3. The DAS as claimed in claim 1, wherein said at least one digital link is arranged for supplying wireless fidelity (WiFi) communication signals, said WiFi communication signals being diplexed together with said RF signals.

4. The DAS as claimed in claim 1, wherein said distribution network is a network in the group of:

a fiber based communication network;
a free-space optics communication network;
a microwave communication network;
a millimeter-wave communication network;
a broadband over power line communication network;
a coaxial communication network.

5. The DAS as claimed in claim 1, wherein said at least one digital link is arranged for supplying said digital communication signals for said at least one RRH (421), said digital link being arranged for utilizing one protocol in the group of: a Common Public Radio Interface (CPRI) protocol and/or an Open Base Station Architecture Initiative (OBSAI) protocol.

6. The DAS as claimed in claim 1, wherein wavelength division multiplexing (WDM) is applied on said spectrum, such that each separate part of said spectrum employs a set of wavelengths being separate from wavelengths being employed by other separate parts of said spectrum.

7. The DAS as claimed in claim 1, wherein frequency division multiplexing (FDM) is applied on said spectrum, such that each separate part of said spectrum employs a set of frequencies being separate from frequencies being employed by other separate parts of said spectrum.

8. The DAS as claimed in claim 1, wherein said at least one digital link is arranged for supplying said digital communication signals for at least one RRH unit (421) and/or at least one Wireless Local Area Network (WLAN) unit (426) and/or at least one pico base station and/or at least one femto base station and/or at least one remote Ethernet unit (423).

9. The DAS as claimed in claim 1, wherein said at least one RU includes the units of one in the group of: at least one RRH unit (421); at least one WLAN unit (426); at least one pico base station; at least one femto base station; at least one remote Ethernet unit (423); or a combination thereof.

10. The DAS as claimed in claim 1, wherein wavelength division multiplexing, WDM, is applied on said signals such that the signals are multiplexed at the multiplexing unit and demultiplexed at the remote multiplexing unit; and
wherein said at least one active RU includes RF circuitry needed for transmitting and receiving RF signals, wherein the RF circuitry includes at least one filter and at least one amplifier.

11. A method for providing signaling in a Distributed Antenna System (DAS; 400), including a distribution network (430, 431, 432), between at least one Remote Unit Controller (RUC; 412) and at least one active Remote Unit (RU; 422) of said DAS (400), said RUC (412) being connected to a core network and providing RF signals to said DAS (400); said method including: allocation of a first part of a spectrum of said signaling for transmission of at least one analog RF link to and from said at least one active RU (422); wherein allocation of at least one second part of said spectrum, being separate from said first part, for transmission of at least one digital link for supplying digital communication signals for one or more of:
at least one Remote Radio Head (RRH) unit (421) physically located in the same casing as said at least one active RU (422),
at least one Wireless Local Area Network (WLAN) unit (426) physically located in the same casing as said at least one active RU (422),
at least one pico base stationphysically located in the same casing as said at least one active RU (422),
at least one femto base stationphysically located in the same casing as said at least one active RU (422), and
at least one remote Ethernet unit (423);
the distribution network includes a multiplexing unit (431) and a corresponding remote multiplexing unit (432) being connected to each other by a bidirectional link (430) for transmission of the at least one RF link and the at least one digital link in both directions between the multiplexing unit and the remote multiplexing unit.

12. The method as claimed in claim 11, wherein said at least one digital link is allocated for supplying Ethernet communication signals.

13. The method as claimed in claim 11, wherein said at least one digital link is allocated for supplying wireless fidelity (WiFi) communication signals, said WiFi communication signals being diplexed together with said RF signals.

14. The method as claimed in claim 11, further comprising:
applying wavelength division multiplexing, WDM, on said signals such that the signals are multiplexed at the multiplexing unit and demultiplexed at the remote multiplexing unit; and
wherein said at least one active RU includes RF circuitry needed for transmitting and receiving RF signals, wherein the RF circuitry includes at least one filter and at least one amplifier.

15. A non-transitory computer-readable storage medium storing executable code for providing signaling in a Distributed Antenna System (DAS; 400), including a distribution network (430, 431, 432), between at least one Remote Unit Controller (RUC; 412) and at least one active Remote Unit (RU; 422) of said DAS (400), said RUC (412) being connected to a core network and providing RF signals to said DAS (400), the code when executed by a processor performs actions comprising:
allocation of a first part of a spectrum of said signaling for transmission of at least one analog RF link to and from said at least one active RU (422);
wherein allocation of at least one second part of said spectrum, being separate from said first part, for transmission of at least one digital link for supplying digital communication signals for one or more of:
at least one Remote Radio Head (RRH) unit (421) physically located in the same casing as said at least one active RU (422),
at least one Wireless Local Area Network (WLAN) unit (426) physically located in the same casing as said at least one active RU (422),
at least one pico base station physically located in the same casing as said at least one active RU (422),
at least one femto base station physically located in the same casing as said at least one active RU (422), and
at least one remote Ethernet unit (423);
the distribution network includes a multiplexing unit (431) and a corresponding remote multiplexing unit (432) being connected to each other by a bidirectional link (430) for transmission of the at least one RF link and the at least one digital link in both directions between the multiplexing unit and the remote multiplexing unit.

16. The non-transitory computer-readable storage medium of claim 15, wherein said at least one digital link is allocated for supplying Ethernet communication signals.

17. The non-transitory computer-readable storage medium of claim 16, wherein said at least one digital link is allocated for supplying wireless fidelity (WiFi) communication signals, said WiFi communication signals being diplexed together with said RF signals.

18. The non-transitory computer-readable storage medium of claim 15, further comprising code when executed by the processor performs actions comprising:
- applying wavelength division multiplexing, WDM, on said signals such that the signals are multiplexed at the multiplexing unit and demultiplexed at the remote multiplexing unit; and
- wherein said at least one active RU includes RF circuitry needed for transmitting and receiving RF signals, wherein the RF circuitry includes at least one filter and at least one amplifier.

* * * * *